Jan. 17, 1933.   H. SANDVOSS   1,894,449
METER FOR HEAT QUANTITIES
Filed June 15, 1927   6 Sheets-Sheet 1

Jan. 17, 1933.   H. SANDVOSS   1,894,449
METER FOR HEAT QUANTITIES
Filed June 15, 1927   6 Sheets-Sheet 4

Jan. 17, 1933. H. SANDVOSS 1,894,449
METER FOR HEAT QUANTITIES
Filed June 15, 1927 6 Sheets-Sheet 5

Patented Jan. 17, 1933

1,894,449

UNITED STATES PATENT OFFICE

HERMANN SANDVOSS, OF FRANKFORT-ON-THE-MAIN, GERMANY

METER FOR HEAT-QUANTITIES

Application filed June 15, 1927, Serial No. 199,138, and in Germany June 18, 1926.

This invention relates to an apparatus for measuring the heat-quantities which are being consumed at the generation or utilization of saturated and superheated steam or the like, i. e. a calorimeter. The novelty of the meter or counter, according to the invention, consists in the special manner of measuring the measuring-values which are decisive for the ascertainment of the heat-quantities for instance in hot water heating installation the measuring of the water-volume and of the temperature-difference between the forward flow and the backward flow; for the generation or utilization of saturated and superheated steam, the measuring of the steam-volume, the steam-pressure and the superheating temperature. These measuring values are then multiplied and the product thus obtained is transferred upon a counter in avoiding any measuring errors.

A calorimeter, according to the invention is shown in several forms of construction, by way of example, in the accompanying drawings in which.

Figure 1:
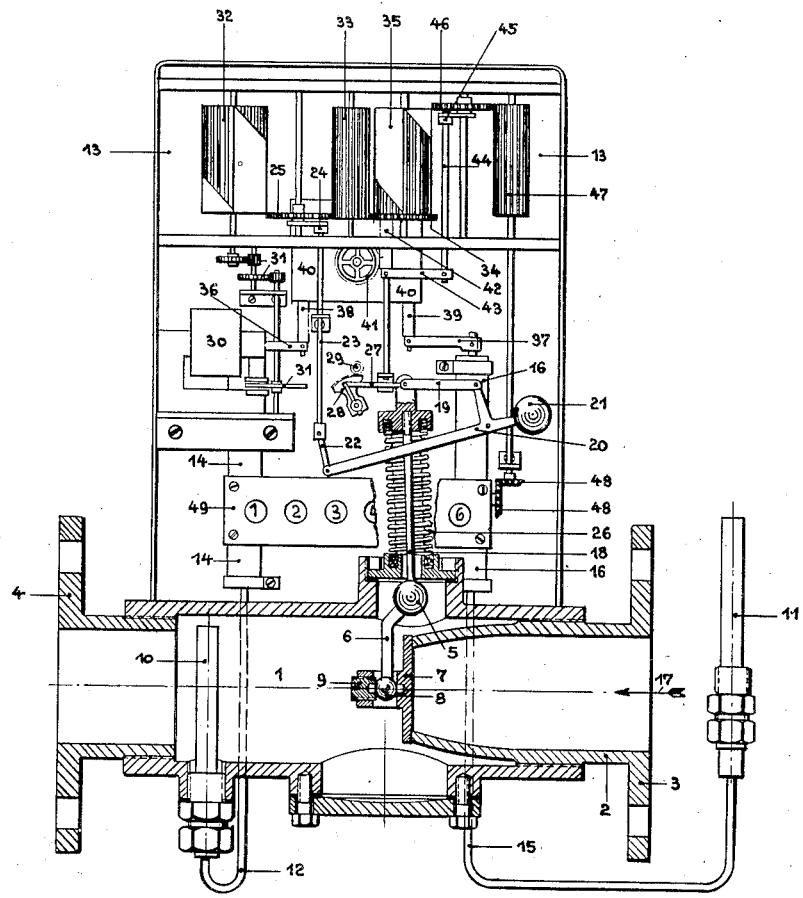
Fig. 1 shows a calorimeter in vertical section, partly in elevation.

The calorimeter shown in Fig. 1 is designed to be used for hot-water heating systems. The lower part 1 of the calorimeter has an inlet nozzle 2 and at each end a connection 3, 4 respectively. In the water-meter a measuring flap 7 is pivotally mounted on a pivot-pin 5 by means of a link 6 and adjustably fixed on the ball-shaped head 8 of the link 6 by means of a screw 9 so that it tightly fits into the inner end of nozzle 2. A thermostat 10 is mounted at the outflow side of the meter and a thermostat 11 at the inflow side of the same. The thermostat 10 is connected by a thin copper-tube 12 to a working element 14 arranged in the upper part 13 of the meter the thermostat 11 being connected by a thin copper-tube 15 to a working element 16 which is also arranged in the upper part 13 of the meter.

The movement of flap 7, caused by the water flowing through the nozzle 2 in the direction of the arrow-line 17 and according to the quantity of the water, is transmitted by a lever 18 and connecting-piece 19 upon an elbow-lever 20, to one end of which a counter-weight 21 is fixed, a link 22 being hinged on the other end of said elbow-lever. The link 22 serves to transmit the movements of the measuring flap 7 upon a rod 23, the head 24 of which raises or lowers a spur-wheel 25. The lever 18 is packed towards the outer side preferably by a very elastic metal-tube 26 which executes the same movements as the lever. By the lever 18 the movement of the flap 7 is transmitted, through a link 27 connected to said lever and a toothed sector 28, upon a pinion 29, on the axle of which a hand is adapted to be fixed which is adapted to move over a scale and to indicate on this scale the velocity of the water or the quantity of water which is actually flowing through.

For measuring the quantity of water a counter-mechanism is arranged in the upper part 13 of the meter. This measuring mechanism is operated for instance by an electric motor 30, a spring-motor, a water-turbine or the like the rotation of which is uniformly transmitted by a gear-transmission 31 upon a cam-cylinder 32 (volume-cylinder). The teeth on the cylinder 32 are arranged or constructed so that they increase from zero at the bottom end to a maximum, every tooth corresponding to a certain quantity of water. As the spur-wheel 25 is raised or lowered more or less, according to the actual velocity of flow or water-quantities either more teeth or less teeth of the cylinder 32 will come into gear so that the spur-wheel 25 rotates always at a speed which corresponds to the quantity of water. The motion of the spur wheel 25 is transmitted, by an intermediate cylinder 33 and a spur-wheel 34, upon a cam-cylinder 35.

The temperatures in the forward and return conduits of the heating system act upon the thermostats 10 and 11 respectively. The expansion of the medium in these thermostats is transmitted through tubes 12 and 15 upon the working elements 14 and 16 so that axial-pins in these elements are pushed up through the upper ends of said elements. This movement is transferred by bridges 36 and 37 and racks 38 and 39 upon a differential gear 40. This differential gear makes a spur-wheel 41 revolve only when there exists a temperature-difference between the forwardly flowing liquid and the backwardly flowing liquid, i. e. only when heat is being consumed. When a temperature-difference occurs, the spur-wheel 41 will, through the intermediary of a rack 42, a bridge 43, a rod 44 and the head 45 of said rod, shift a spur wheel 46 in downward direction, said spur wheel 46 being shiftably mounted on its axle. As the cam-cylinder 35 (temperature cylinder) has a number of teeth increasing in accordance with the actual temperature, and as it revolves in accordance with the quantity of water flowing through, the water quantity is mechanically multiplied by the temperature-difference owing to the shifting of spur-wheels 46. The product, which represents the consumed heat-units, is transmitted by the rotation of spur-wheel 46 upon a toothed cylinder 47 and thence, through a bevel-wheel transmission 48, upon a counter-mechanism 49. On this counter-mechanism the heat-quantity consumed is indicated in calories.

In order to indicate separately the temperature-difference, a hand moving over a scale can be arranged on the axle of the spur-wheel 41 of the differential gear 40.

The upper part 13 of the apparatus, in which the multiplying elements are mounted, is tightly closed by a bottom-plate and a top-plate in order to prevent access of moisture and of fresh oxygen, so that the apparatus is very durable.

The apparatus described may be used also as a measuring apparatus operated by water from condensation and in this case only temperature-measuring is necessary so that the apparatus can be mounted not only in gravity-hot-water-heating-systems but also in steam-heatings and everywhere where the heat of flowing media has to be measured.

Figure 2:
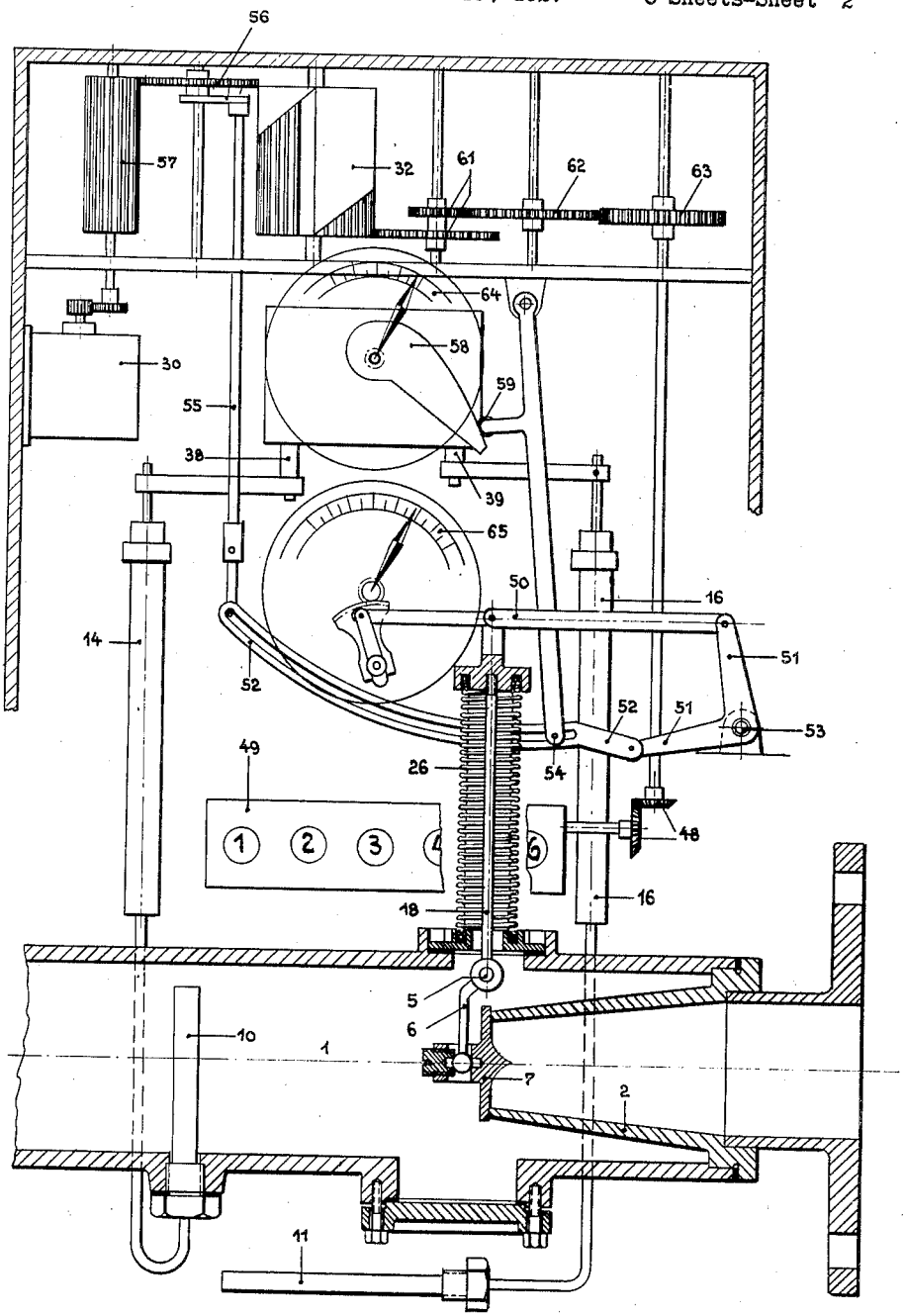
Fig. 2 is a similar view showing a second form of construction of the calorimeter.

In the form of construction of the meter shown in Fig. 2 the water-meter 1 has an inflow-nozzle 2, connections similar to 3 and 4, Fig. 1, a measuring flap 7, pivotally mounted at 5 by means of a link 6, a thermostat 10 for the inflowing water and a thermostat 11 for the backflowing water.

The measuring of the water-quantity is carried out by the measuring-flap 7, the lever 18 and the elastic-tube 26. The oscillation of lever 18 is transmitted by a link 50 to an elbow-lever 51 which is connected to a cam-lever 52. The elbow-lever 51 is pivotally mounted on a pivot-pin 53. The cam-lever 52, having a pivot pin 54, operates an adjustable rod 55, on the top end of which a spur-wheel 56 is keyed. This spur-wheel transmits the rotation of a toothed cylinder 57, driven from a motor 30, upon a cam-cylinder 32 (volume cylinder). The thermostats 10, 11 serve for measuring the temperature difference in the inflowing and backflowing liquids, the strokes of said thermostats being transmitted through the intermediary of the working elements 14 and 16, upon the racks 38 and 39 which operate the differential-gear 40. The temperature-difference is transmitted by the differential-gear 40 to a cam disk 58 on which a roller 59 rests which communicates to an oscillatable-lever 60 oscillations of different amplitudes. The pivot-point 54 of the cam-lever 52 is thereby shifted whereby the ratio of transmission is varied and the water-quantity is automatically multiplied by the temperature-difference. Although the measuring is carried out with the greatest possible accuracy, only one cam-cylinder, i. e. the volume-cylinder 32, is required and the shiftable spur-wheel 56 as this spur-wheel is in the according calories-position. The rotation of the cam-cylinder 32 is transmitted by gear wheels 61, 62, 63 and the bevel-wheel-transmission 48 upon the counter-mechanism 49, which indicates in heat-units the quantities of heat which have been consumed. Besides the heat-units consumed, the temperature-difference is indicated on a scale 64 and the water-quantity which has flown through, or the speed, is indicated on a scale 65.

When the heating-medium is shut off the temperature-difference which still exists cannot cause any measuring of the heat-quantities as the radius of the cam lever 52, in its position of rest, is of the same length as the oscillating- or movement-radius of the pivot-point 54.

In order to avoid eddy-currents the measuring flap 7 is constructed in such a manner that its side facing the direction of flow is shaped in accordance with the stream-lines.

The cam-cylinder 32 is not shiftable but only the spur-wheel 56, so that only little working power is required. By the omission of the second cam-cylinder and by the new transmission- or multiplying-arrangement a specially accurate working is ensured, as all the levers can be balanced and as different working of certain elements is excluded.

Figure 3:
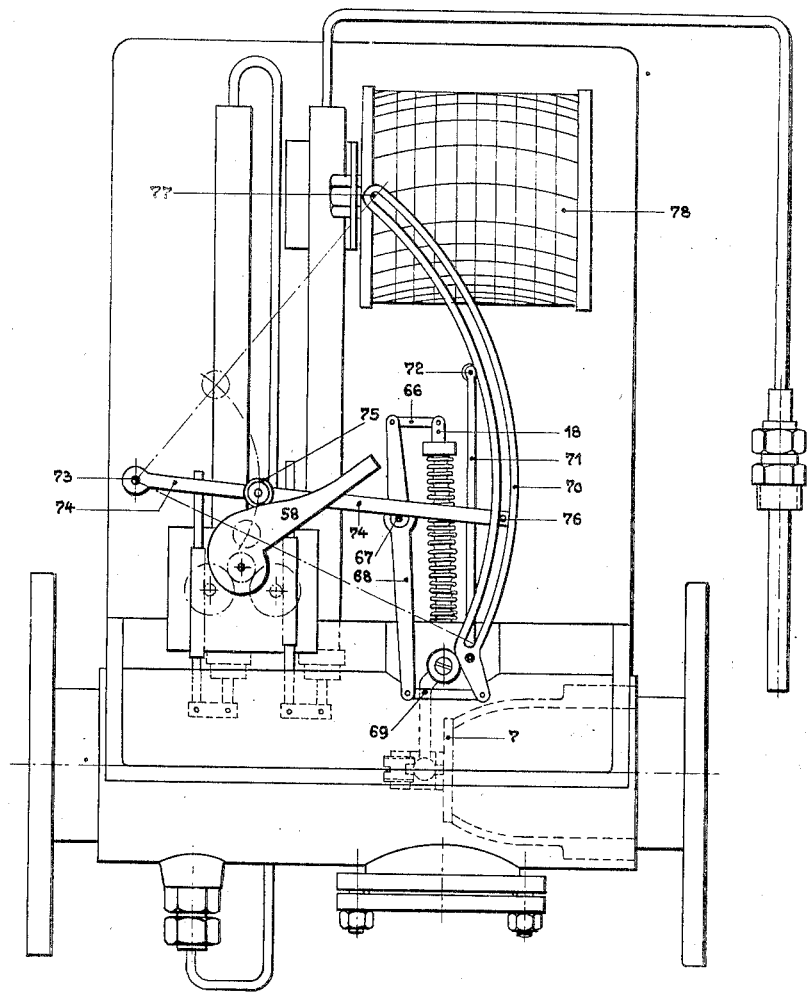
Fig. 3 shows a third form of construction of the calorimeter.

In the form of construction shown in Fig. 3 the lever 18 of the measuring flap 7 operates, when the heating medium is flowing, a connecting lever 66 which in its turn operates a lever 68, pivotally mounted at 67 and connected, through an intermediate element 69, with a stylus arm 70. The stylus arm 70, which is constructed like a cam-lever, is oscillatably suspended on a rod 71 having a stationary pivot-point 72. To use the stylus arm 70, which indicates only the water-quantity flowing through, also for multiplying by the temperature-difference the following mechanism is provided.

The differential gear 40, when it is being operated, drives the cam-disk 58 whereby a lever 74 having a roller 75 and being pivotally mounted on a pivot-pin 73 is raised or lowered. The end of the lever 74 serves as pivot-pin 76 for the stylus 70. The curve along which the pivot-pin 76 can move is of such shape that in the zero-position of the lever 18, i. e. when there is no flow in the meter or when the inflow of heating medium is shut off, the lever 74 can oscillate at any amplitude around its stationary pivot-point 73 and without operating the stylus arm 70. The position of the stylus arm 70 depends on the temperature-difference.

By displacing the pivot point 76 in accordance with the temperature-difference, the lever- and transmission-ratio is varied whereby oscillations of the stylus arm 70 of greater or less great amplitudes are caused and, at the same time, by the operation of the logarithmic cam-disk 58, an accurate mechanical multiplying of the water-quantity by the temperature-difference into consumed calories is effected, which the stylus 77 records upon a recording-strip 78 so that, by calculating in the well known manner, the total sum of the heat-units consumed is ascertained. Owing to its oscillatable suspension the cam-lever 70 is balanced in any position, an accurate working being thus ensured.

Figures 4, 5:
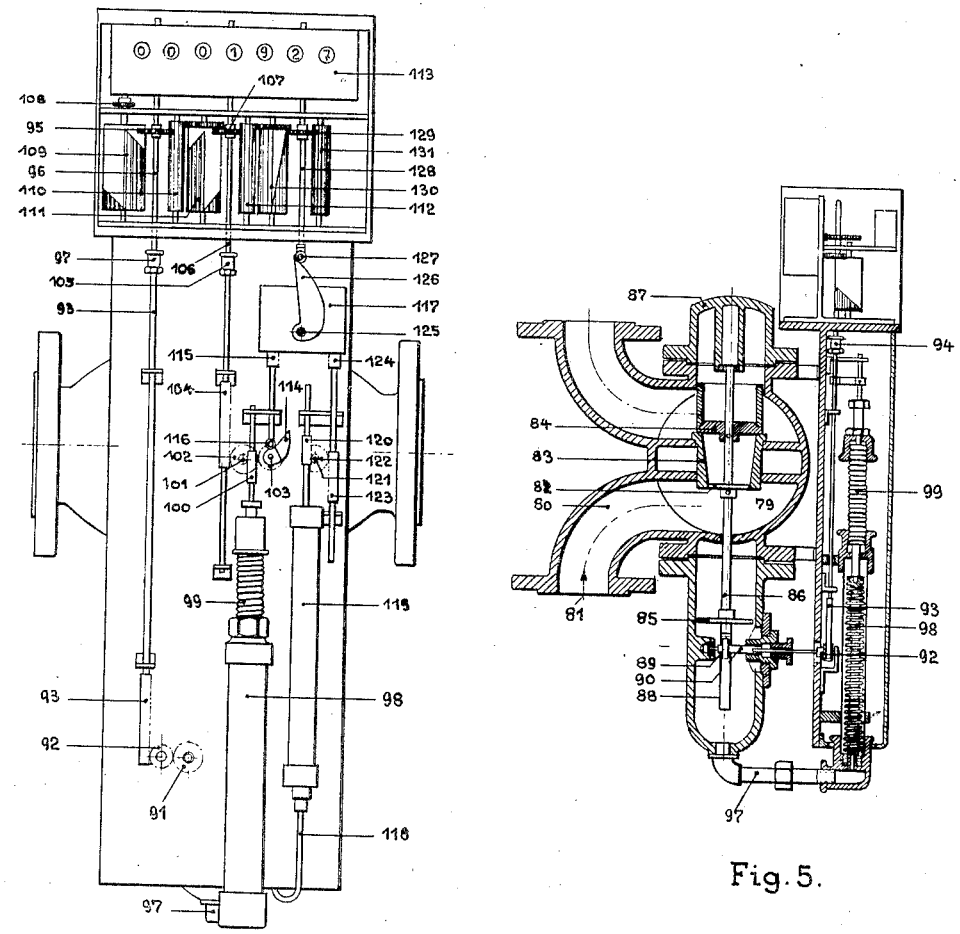
Fig. 4 shows a form of construction in which the inlet and outlet are arranged laterally to the conduits connected to the housing.
Fig. 5 shows a form of construction in which the inlet and outlet are effected through vertical conduits connected to the measuring housing through the intermediary of the two bends. The apparatus is intended to be fitted in horizontally and vertically extending conduits as desired.
Figure 8:
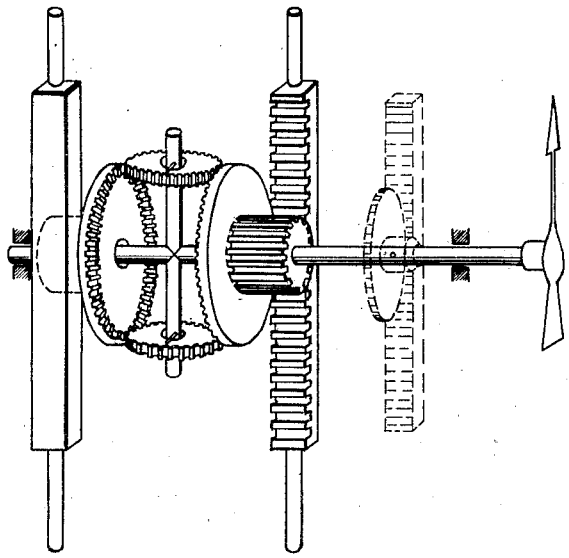
Fig. 8 shows the differential gearing.

In the form of construction of the colorimeter shown in Figs. 4 and 5 and which is designed to be used for measuring the heat-contents or the consumption of the heat-units at the generation or utilization of saturated and superheated steam and to be built into a vertical conduit, the steam to be measured is supplied from below in the direction of the arrow-line 81 through a curved connection tube 80 to a chamber 79. A measuring cone 83 is closed at the bottom end by a measuring disk 82 when no steam is being supplied to chamber 79. When steam is being supplied to chamber 79 the measuring disk 82 is forced more or less deeply into the measuring cone 83, in accordance with the quantity of in-flowing steam, whereby the actually required cross-section for the passage of the steam between cone 83 and disk 82 is uncovered. 84 is a heavy mass which is carried by a rod 86 which carries further the measuring disk 82 and a braking disk 85, said rod projecting into the lid 87 so that no onerous edges and hollow spaces exist in the steam-outlet. The lower end of rod 86 forms a rack 88 (Fig. 2) which meshes with a pinion 89 keyed on one end of a shaft 90 on the other end of which a spur-wheel 91 (Fig. 4) is keyed which, through an intermediate wheel 92 meshes with a rack 93 (Fig. 4). This rack 93 carries on its top end a disk 94 on which the lower end of a shaft 96 rests which carries a spur-wheel 95. The movement of the measuring-disk 82, which is produced by the steam flowing through the measuring cone 83 and according to the quantity of steam, is transmitted by the rod 86, rack 88, pinion 89, shaft 90, gear wheel 91, pinion 92, rack 93, disk 94 and rod 96 upon a spur-wheel 95 so that this spur-wheel is lowered and lifted accordingly.

In order to ascertain the second measuring value, i. e. the steam pressure, this pressure is transmitted through a pipe 97 upon a metal hose 98 which is elastic in longitudinal direction (Fig. 5). This metal hose expands until the pressure of the steam acting upon the bottom of the hose and the pressure of a spring 99 acting upon the top end of the hose, are equal. The value of the expansion of the metal hose 98 corresponding to the actual steam pressure is transmitted through the spring 99 upon a rack 100 which thus rotates a pinion 101, spur wheel 102 and a toothed wheel 103. A rack 104 meshing with a spur-wheel 102 is thus lowered accordingly. The rack 104 carries on its top end a disk 105 on which the axle 106 of a spur-wheel 107 rests. By the movement of rod 93 and plate 94 and of rod 104 and plate 105 the spur-wheels 95 and 107 are lowered more or less whereby the speed of a multiplying mechanism, arranged in the top part of the apparatus, is controlled. By a convenient driving power (clockwork or motor) 108 a cam-cylinder (volume-cylinder) 109 is uniformly rotated. The number of teeth on this cylinder 109 increases in downward direction along a helical line, increasing from zero at the top end to maximum at the bottom end. As the spur-wheel 95, the axle 96 of which rests on the disk 94, is lowered in accordance with the steam-volume flowing through the measuring cone and moving the measuring disk 82, a more or less great number of teeth of cylinder 109 will come into gear with the spur-wheel 95. The revolving speed of disk 95 will therefore increase and decrease with the steam-velocity. The movable spur-wheel 95 is directly in gear with an intermediate cylinder 110 and through the same with a cylinder 111. The teeth of cylinder 111 are cut out in curved shape according to the factor by which the steam-quantity has to be multiplied at increasing pressure. As the movable spur-wheel 107, the axle 106 of which rests upon the disk 105 of rack 104, is lowered and the pressure of the steam gets higher, and as the cylinder 101 driven by the volume-cylinder 109, assumes a revolving speed according to the volume, a mechanical multiplying of the volume by the pressure takes place the product of which represents kilograms steam. This product is transmitted when only measuring of the saturated steam is required, by a cylinder 112 upon a counter-mechanism 113.

For ascertaining the degree of superheating, of superheated steam the temperature of the normal saturated steam has to be deducted from the temperature of the superheated steam. This normal temperature is ascertained by the pressure-cartridge 98, 99 as the same temperature corresponds always to a certain pressure. The rack 100 driven by the pressure-cartridge rotates through the spur wheel 103 a cam disk 114 on which a roller 116 slides which is connected with a rack 115. This rack 115 is, together with the roller 116, lifted or lowered by the cam-disk 114 in accordance with the increase or decrease of the pressure. The rack 115 engages with a differential gear 117.

The temperature of the superheated steam is measured by a thermostat connected by a tube 118 to a working element 119. With this working-element 119 a rack 120 is connected. When this rack descends at increasing temperature, a rack 123 is lifted through the intermediary of a pinion 121 and of a spur-wheel 122 and consequently also a rack 124, engaging with the differential-gear 117. The cam-disk 114 is so constructed that at saturated steam the strokes of the racks 115 and 124 are equal. In this case a main-shaft 125 of the differential-gear 117, and on which a cam-disk 126 is keyed, will not revolve. At superheating however the rack 124 is lifted for a height corresponding with the temperature-difference so that the cam disk 126 will oscillate to the left. On this cam-disk rests a roller 127 of a shaft 128 of a movable wheel 129. At the oscillation of cam-disk 126 to the left the roller 127 and the shaft 128 with a wheel 129 will descend. A cam-cylinder (temperature cylinder) 130 of the multiplying mechanism has a speed corresponding to the steam-quantity owing to the transmission of the revolving movement of the volume cylinder upon the cylinder 130 by the cylinders 110, 111 and 112. The gap in the teeth of cylinder 130 is of such shape that the steam-quantity is multiplied by a factor corresponding to the superheating. This result is transmitted by a cylinder 131 upon the counter-mechanism 113 which indicates directly the heat-units contained in the steam which flows through the meter.

In the calorimeter shown in Figs. 1, 2, 4 and 5 the transmission of the continuously varying measuring values, for instance water-quantity and temperature-difference or the multiplying of the same and the transferring of the product from multiplication upon the counter mechanism is effected in a closed circuit by cam-cylinder-gears.

In the form of construction of the calorimeter shown in Figs. 1, 2, 4 and 5, the measuring factors obtained from temperature-difference or pressure and volumes and multiplied the one by the other, operate a transmission-gear arranged in front of a measuring-mechanism and driven by a uniformly rotating electric motor or the like.

Figure 9:
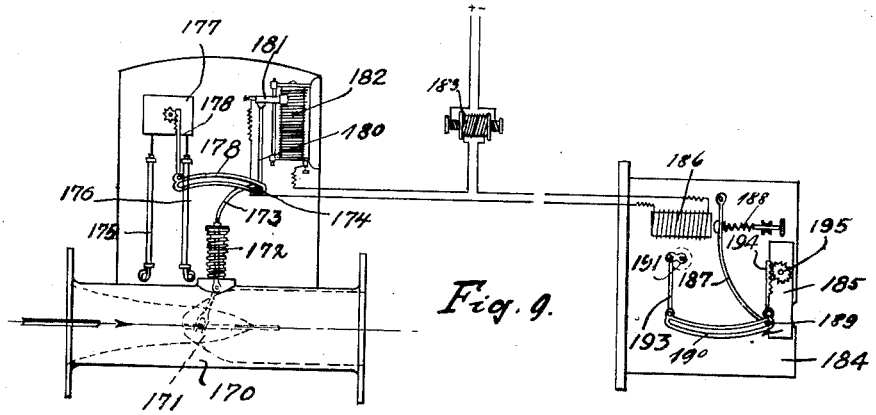
Figs. 9 and 10 illustrate the arrangement and construction of a calorimeter and the connection of the same to an addition-counter for the heat-units arranged at a distance from the calorimeter and in application to a heating-installation.
Figure 10:
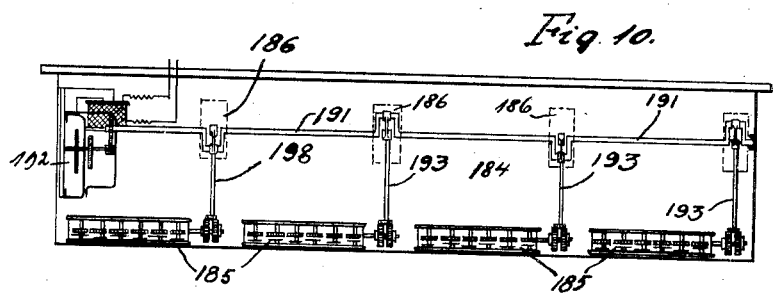
Figure 11:
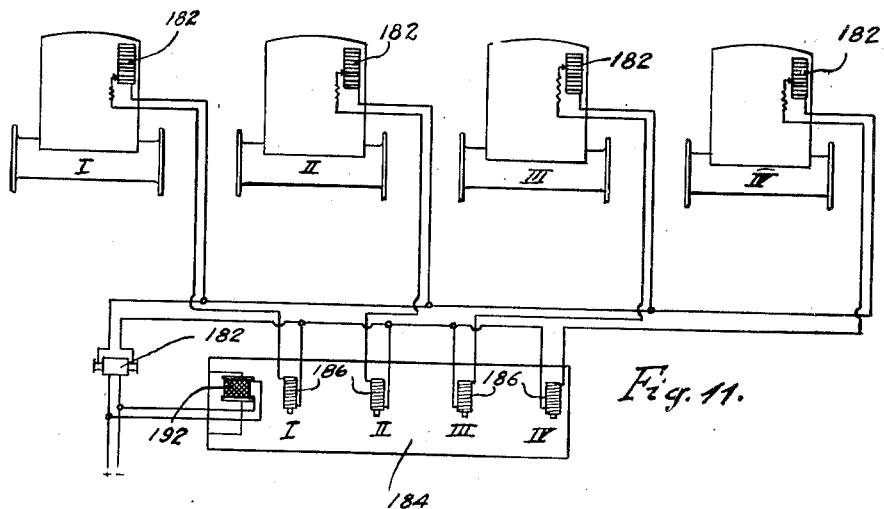
Fig. 11 shows the connection-diagram for four calorimeters.

In Figs. 9 to 11 the arrangement and construction of a calorimeter and the connection of the same to a heat-units adding mechanism, arranged at a distance, are shown by way of example and in application to a heating plant.

The measuring flap 170 (Fig. 9) is built into the conduit-pipe of a heating plant at a suitable point. The velocity- or volume-measuring is done by a relieved drop-shaped measuring cone 171 similar to that shown in Fig. 6, the movements of which are transmitted by an elastic-tube 172 upon a lever 173 which draws along a shiftable bearing-point 174. The temperature-difference is ascertained by thermostats 175, 176 which operate, in a commonly used manner a differential-gear 177. The amplitude of oscillation of this gear is transmitted upon a rack 178 connected to a cam-lever 179. The greater the temperature-difference is, the more will the cam-lever 179 oscillate downwards to the left. When the velocity increases, the bearing-point 174 will be shifted to the left whereby the amplitude of oscillation of the cam-lever 179 to the right increases, the amplitude representing at the same time the multiplication-product. Oscillations are produced only when both factors occur at the same time. The transmission of this variable product upon a counter-mechanism situated at any distance is obtained in the following manner:

The oscillations of the cam-lever 179 are transmitted upon a rod 180 which draws along a bow-shaped contact 181 of a cylinder-rheostat 182 series-connected to a transformer 183, whereby more or less turns of the rheostat are inserted into the circuit in which it is mounted. When the multiplication-product is zero the circuit has been automatically interrupted. At increasing value of the product or of the amplitude of oscillation of the lever 179 and of the rod 180 the series-resistance 182 is gradually reduced so that at the same time the corresponding strengthening of current occurs. This current of variable strength is conducted to a relay box 184, mounted at any desired distance and which contains at the same time the addition mechanisms 185. For transmission of the multiplication product at a distance electro-magnets 186 serve as feeling-elements which are connected to the rheostat 182. Every variation of the strength of current due to the rheostat 182 influences the electro-magnet 186 in such a manner that its position with regard to an armature is altered. This movement of the electro-magnet 186 is transmitted upon a lever 187, pivotally mounted on knife-edges, loaded in accordance with the strength of current by an adjusting spring 188, and gripping with its end over a shiftable bearing-point 189 which serves also as pivot-point for a cam-lever 190.

A crank-shaft 191 (Fig. 10) is driven by a constantly revolving motor 192, whereby a connecting rod 193 communicates to the cam-lever 190 uniform oscillating movements to the left. At increasing value of the multiplication-product and at corresponding strengthening of the electro-magnet 186 the bearing-point 189 will be shifted more and more to the left by the lever 187 so that the oscillating movements of the cam-lever 190 to the right increase also, the amplitudes of which, which represent the consumed quantities of heat, being positively transmitted directly by means of a rack 194 upon a change-gear 195 connected to the counter-mechanism 185. When the multiplication-product is zero the connecting-rod 193 does not operate the rack 194.

Fig. 10 shows a relay-meter-box 184 with the electro-magnets 186 and with four counter-mechanisms 185 for four different meters of heat-quantities. All measuring-mechanisms 185 are operated by the common crank-shaft 191, driven from the motor 192.

As soon as one of the measuring-mechanisms 185 (Fig. 10) is operated the motor 192 switches in automatically. When all measuring-mechanisms are at rest the motor 192 is cut out so that a minimum of consumption of current is ensured.

Fig. 11 shows the connection-diagram for four meters of heat-quantities I, II, III, IV with the rheostats 182, the electro-magnets 186, the motor 192 and the transformer 183 which preferably may also be mounted in the meter-box 184.

In the calorimeter shown in Figs. 1 to 5 a simple measuring flap 7 (Figs. 1, 2, and 3) or a simple measuring plate 82 (Fig. 5) serve for measuring the velocity of flow or the volume. These simple elements are sufficient for measuring very slow velocities of flow. When the velocity of flow exceeds a certain limit the dynamic resistance or the loss from pressure becomes too great. In order to avoid this, it is advisable to construct the element for measuring the velocity of flow or volume as a drop-shaped cone, the form of which depends on the velocity of flow in question.

Figure 6:
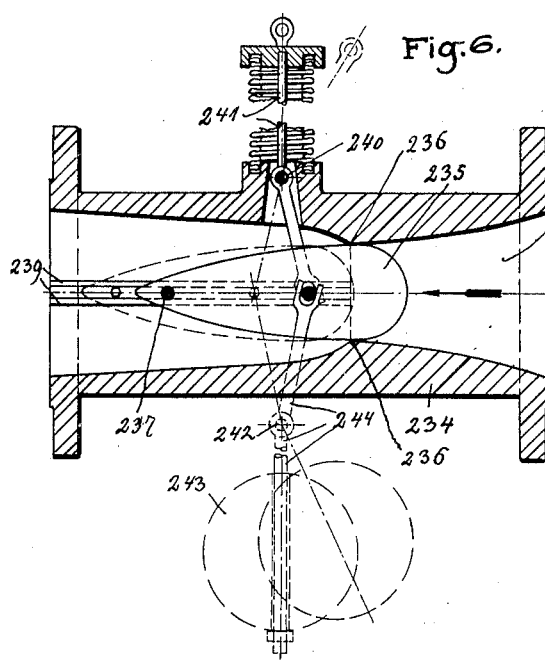
Figs. 6 and 7 show respectively in longitudinal section and in end elevation a measuring chamber with a drop-shaped cone.
Figure 7:
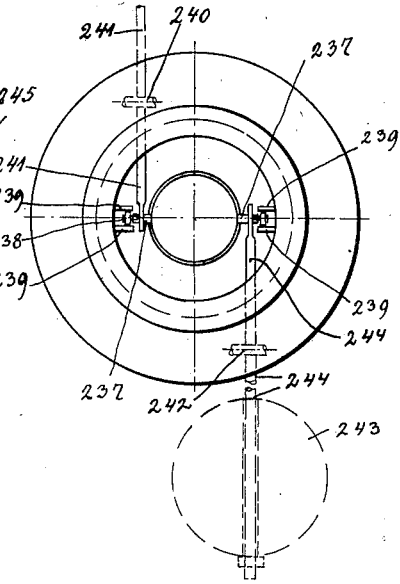

Figs. 6 and 7 show in longitudinal section and in end elevation a calorimeter chamber having such a drop-shaped cone. The meter-chamber is designated by 234 and the drop-shaped cone by 235. When no liquid flows through the meter chamber 234 the cone rests on its seat 236. When a medium (water, steam or the like) flows in the direction of the arrow-line through the meter-chamber, the cone 235 is lifted off its seat 236 more or less in accordance with the velocity of flow or of the quantity.

In order to ensure central guiding in the chamber 234 the cone 235 has two journals 237, each with a roller 238, said rollers running in guide rails 239. The movement of the measuring cone 235, which takes place when a medium is flowing through the chamber 234, is transmitted upon the meter-casing by means of an elbow-lever 241, pivotally mounted at 240 in the chamber 234.

In meters designed for measuring high velocities of flow, for instance of saturated and superheated steam, compressed gases or the like, the cone 235 is preferably loaded by an elbow-lever 244, pivotally mounted at 242 and carrying a counter-weight 243. As with the increase of the amplitude of the oscillation of the elbow-lever 244 the counter-pressure of the counter-weight 243 increases also, it will become proportional to the increase of the potential-pressure from flow. With corresponding heaviness and shape of the counter-weight 243 the cone 235 is balanced at any velocity, wherefrom results a great accuracy of measuring.

With the arrangement of the counter-weight as described the measuring cone 235 does not produce for the individual increasing velocity-steps uniform but logarithmically decreasing amplitudes of oscillation. When these amplitudes of oscillation would increase uniformly, the calculations and the construction of the whole apparatus would be considerably simplified. In order to obtain this, suitable auxiliary means, cam-disks, levers or the like, are arranged whereby the amplitude of oscillation of the counter-weight is logarithmically decreased accordingly so that the amplitudes of movement of the cone 235 increase uniformly. In order to make the inflowing of the medium free from resistance the portion of the chamber 234 up to the seat 236, i. e. the admission-nozzle 245, is of hyperbolic-shape and the other portion of the measuring chamber 234, situated behind the seat 236, is parabolic.

I claim:—

1. A calorimeter for measuring or counting the heat quantities consumed in hot water heating systems at the generation or utilization of saturated and superheated steam, comprising in combination with the steam conduit, a non-loaded flap valve in said conduit adapted to shift according to the velocity of flow of the water, means actuated by the shifting of said valve for measuring the flow of water through said conduit for the ascertaining of the heat quantities consumed, thermostats one at the inflow side and the other at the outflow side of the heating system adapted to measure the temperature of the water before entering the system and on leaving the system, and means for transmitting the movements of said thermostats to the meter to ascertain the temperature difference of the water on entering and on leaving the system, this temperature difference divided by the quantity of water flowing through the system representing the heat quantities consumed per unit of water flowing through the system.

2. A calorimeter for measuring or counting the heat quantities consumed in hot water heating systems at the generation or utilization of saturated and superheated steam, comprising in combination with the steam conduit, a non-loaded flap in said conduit to shift according to the velocity of flow of water, a lever connected to said flap adapted to shift longitudinally according to the position of said flap, an elastic tube packing said lever towards the outer side adapted to perform the same movements as said lever, a counter mechanism for indicating the flow of water through said conduit, means for transmitting the movement of said elastic tube to said counter mechanism to indicate the quantity of water flowing through said conduit, thermostats one at the inflow side and the other at the outflow side of the heating system adapted to measure the temperature of the water on entering and on leaving the system, and means for transmitting the movements of said thermostats to the meter to register the different temperatures recorded by said thermostats, this temperature difference divided by the quantity of water flowing through said conduit representing the heat consumed per unit of water flowing through the system.

3. A calorimeter as specified in claim 1, comprising in combination with the measuring flap, transmission gears operated by said flap, a spur wheel shiftable in vertical direction and raised or lowered by said transmission gear in accordance with the velocity of flow of the water, a cam cylinder with which said toothed wheel gears, means for positively and uniformly rotating said cam cylinder, an intermediate toothed cylinder rotated from said spur wheel which itself rotates at a revolving speed according to the number of teeth engaging with said cam cylinder, a spur wheel rotated by said toothed cylinder, a second cam cylinder with which said second mentioned spur wheel is in gear, a spur wheel shiftable in vertical direction meshing with said second mentioned spur wheel, a thermostat controlled by the inflowing liquid, a thermostat controlled by the outflowing liquid, a differential gear controlled by said two thermostats to ascertain the temperature difference, means for lifting or lowering said second mentioned shiftable spur wheel from said differential gear so that the volume is mechanically multiplied by the temperature difference, a counter-mechanism for the calories, and means for transmitting the revolving speed of said second mentioned shiftable spur wheel upon said mechanism.

4. A calorimeter as specified in claim 1, comprising in combination with the measuring flap for measuring the water volume, a cam cylinder, a spur wheel adapted to effect the mechanical multiplication of the water-quantity with the temperature difference and the transmission of the product of the multiplication of a positively driven spur wheel upon said cam cylinder, a cam lever for transmitting the motion of said spur wheel to said cam cylinder, a pivot pin on which said cam lever is pivotally mounted, transmission means for transmitting the oscillation of said measuring flap upon said cam lever, means for ascertaining the temperature difference of the inflowing and outflowing water, means for transmitting the temperature difference upon said pivot pin of said cam lever so that the amplitude of the oscillation of said cam lever depending on the water quantity is logarithmically increased or decreased according to the calorimetric ratio of transmission.

5. A calorimeter as specified in claim 1, in which the side of the measuring flap which faces the inflowing liquid is of a shape according to the stream lines in order to ensure a flow of the liquid free from eddies.

6. In a calorimeter as specified in claim 1 in combination with the measuring flap, a registering strip, a balanced cam-disc-lever adapted to balance said registering strip for recording on said registering strip the heat units consumed, and two sets of transmission means operated from said measuring flap for producing logarithmically multiplying oscillations of said cam disc lever.

7. A calorimeter as specified in claim 1, designed for measuring saturated and superheated steam, comprising in combination with an adding counter mechanism, cam cylinders for multiplying the measuring factors volume and pressure, a differential gear adapted to be operated by the products of stroke controlled by temperature and pressure and positively rendered similar to said factors, means for adding the heat units necessary for the superheating to the saturated steam multiplication products and transmitting same to said adding counter mechanism.

8. A calorimeter as specified in claim 1, designed for measuring saturated and superheated steam, comprising in combination with an adding counter mechanism, cam cylinders for multiplying the measuring factors volume and pressure, a differential gear adapted to be operated by the products of stroke controlled by temperature and pressure and positively rendered similar to said factors, and transmission elements adapted to variably control the amplitude of oscillation of said differential gear for obtaining the correct superheating-heat quantities increasing or decreasing by the pressure-stroke.

9. A calorimeter as specified in claim 1, comprising in combination with the measuring flap of a drop-shaped cone shape in order to avoid resistances and losses from pressure, a counter-weight adapted to control said flap when high speeds are in question.

10. A calorimeter as specified in claim 1, comprising in combination with the measuring flap of a drop-shaped cone shape in order to avoid resistances and losses from pressure, a counter-weight adapted to control said flap when high speeds are in question, interposed means, such as cam discs, and levers adapted to logarithmically reduce the oscillating action of said counterweight according to the speed so that the amplitudes of the movements of said drop-shaped cone increase uniformly.

In testimony whereof I affix my signature.

HERMANN SANDVOSS.